(12) United States Patent
Yu

(10) Patent No.: US 8,817,176 B2
(45) Date of Patent: Aug. 26, 2014

(54) CAMERA POSITIONING SYSTEM FOR EYE-TO-EYE COMMUNICATION

(75) Inventor: Chin-Ming Yu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 203 days.

(21) Appl. No.: 13/494,940

(22) Filed: Jun. 12, 2012

(65) Prior Publication Data

US 2013/0258180 A1 Oct. 3, 2013

(30) Foreign Application Priority Data

Apr. 3, 2012 (TW) .............................. 101206002 A

(51) Int. Cl.
*H04N 5/225* (2006.01)

(52) U.S. Cl.
USPC ....... 348/373; 348/207.99; 348/375; 348/376

(58) Field of Classification Search
CPC ... G01S 7/04; H04M 1/0264; H04M 2250/20; H04N 1/00204; H04N 2101/00; H04N 2201/0063; H04N 7/144
USPC ........... 348/373–376, 207.99, 340, 86, 91–92
See application file for complete search history.

*Primary Examiner* — Twyler Haskins
*Assistant Examiner* — Padma Haliyur
(74) *Attorney, Agent, or Firm* — Novak Druce Connolly Bove + Quigg LLP

(57) ABSTRACT

A camera positioning system includes a securing bracket fixed near a screen portion of a display screen, a belt, a shaft member rotatably connected to the securing bracket, and a spring member elastically connected between the shaft member and the securing bracket to provide an elastic force to make the shaft member automatically rotate. The belt is wound around the shaft member with an inner end fixed to the shaft member and an outer end extending out from the securing bracket to pass through the screen portion. A camera is removable secured to the belt.

15 Claims, 6 Drawing Sheets

CAMERA POSITIONING SYSTEM FOR EYE-TO-EYE COMMUNICATION

BACKGROUND

1. Technical Field

The present disclosure generally relates to camera positioning systems for video communication, more specifically, to a camera positioning system for eye-to-eye communication in a videoconferencing.

2. Description of Related Art

Videoconferencing is rapidly becoming a popular method of communication between remote parties who wish to approximate face-to-face contact without travel. More events such as business meetings, family discussions, and shopping may be expected to take place through videoconferencing.

Unfortunately, videoconferencing has been limited in the past by the relative positions of camera, display screen and person. More specifically, the camera is typically positioned above, beside, or below the screen. During a videoconference, each person looks his or her own screen. The person looking into the screen appears to be looking above, below, or to the side of the person with whom they are speaking. Thus, eye contact is never actually made because neither party looks at the camera. Consequently, both parties cannot perceive a true face-to-face communication.

Therefore, a need exists in the industry to overcome the described problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
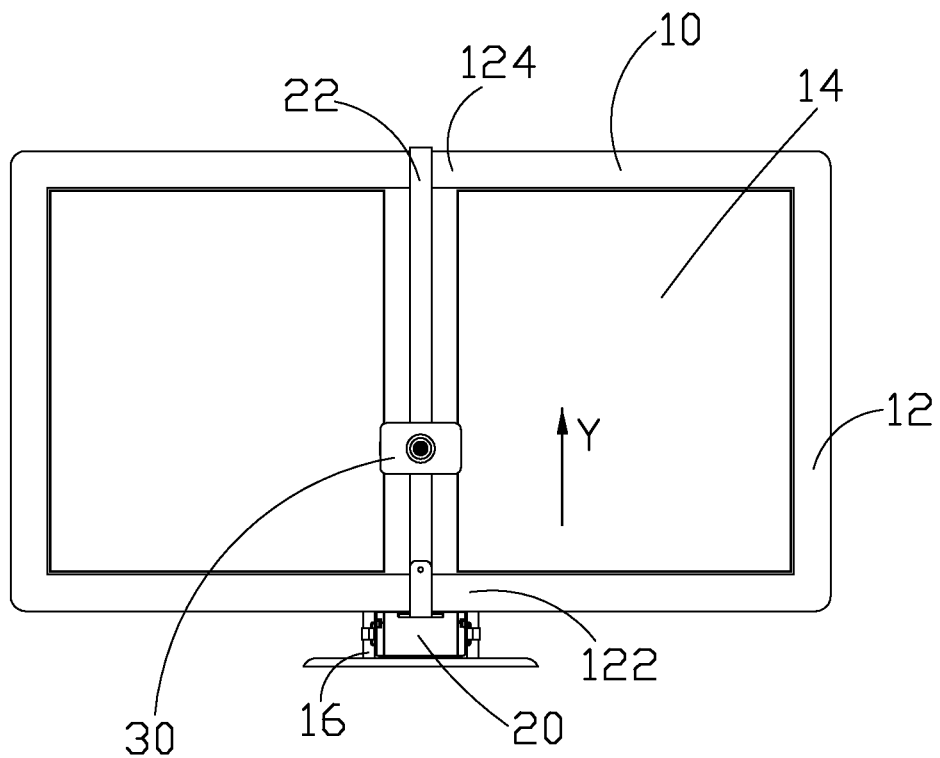
FIG. 1 is a schematic view of a camera positioning system with an exemplary embodiment of the disclosure employing in a display screen.
Figure 2:
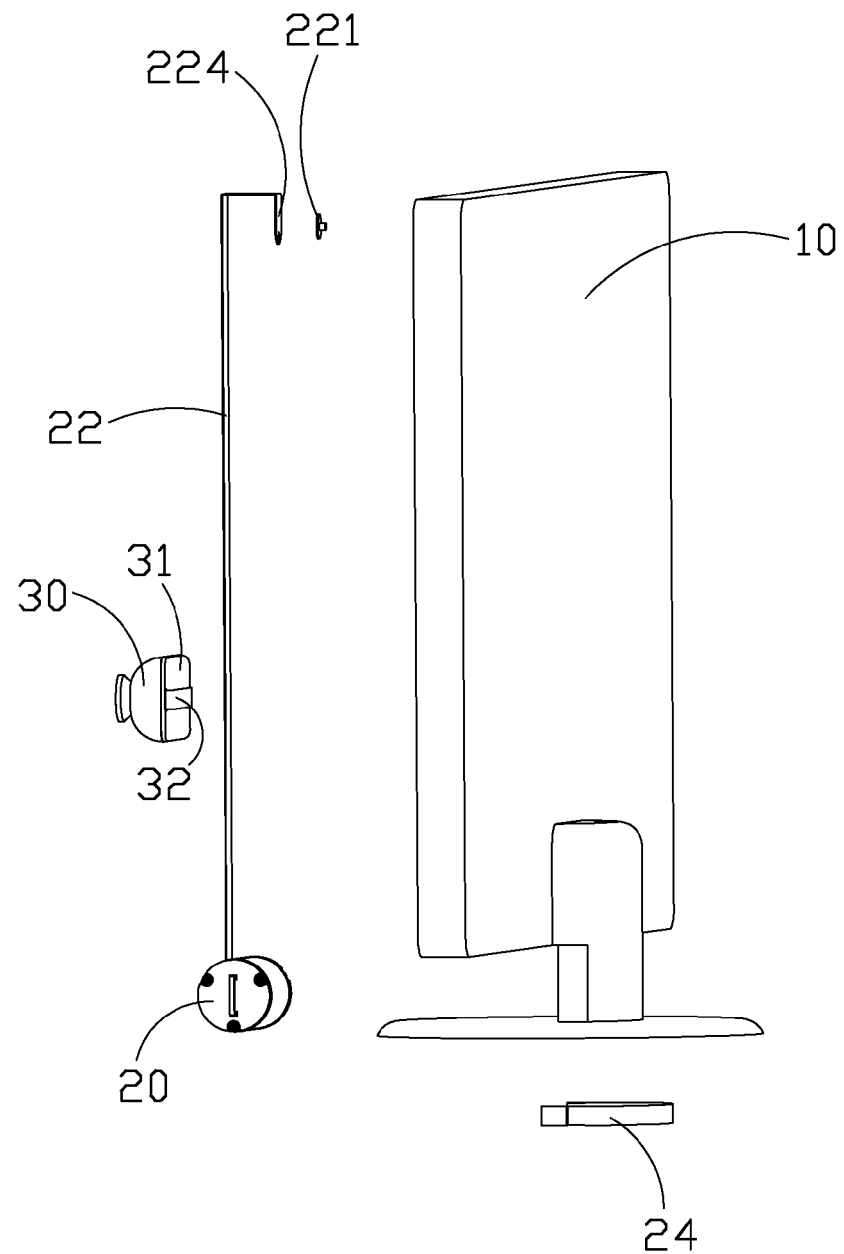
FIG. 2 is a disassembled schematic view of FIG. 1.

With reference to FIG. 1 and FIG. 2, a camera positioning system 20 is used to secure a camera 30 onto a display screen 10 and allows a user to adjustably position the camera 20 along a vertical axis Y of the display screen 10. The display screen 10 may be of any known type such as a cathode ray tube (CRT) screen, a liquid crystal display (LCD), a liquid plasma display, a computer monitor, television, for example.

In this embodiment, the display screen 10 comprises a frame 12, a screen portion 14 configured in the frame 12 and a base 16. The frame 12 comprises a bottom side 122 adjacent to the base 16 and a top side 124 opposite to the bottom side 122. The camera positioning system 20 is fixed near the screen portion 14 of the display screen 10 and passes through the screen portion 14.

The camera 30 is removably secured to the camera positioning system 20 and positioned on the screen portion 14. Therefore, during videoconferencing, the camera 30 can be adjusted so that the eyes of the user are looking at the camera 30, providing eye contact communication for the user whose image is displayed on the screen portion 14. That is, both parties in the videoconferencing can perceive a true face-to-face communication. In this embodiment, the camera 30 may be a wireless camera.

Figure 3:
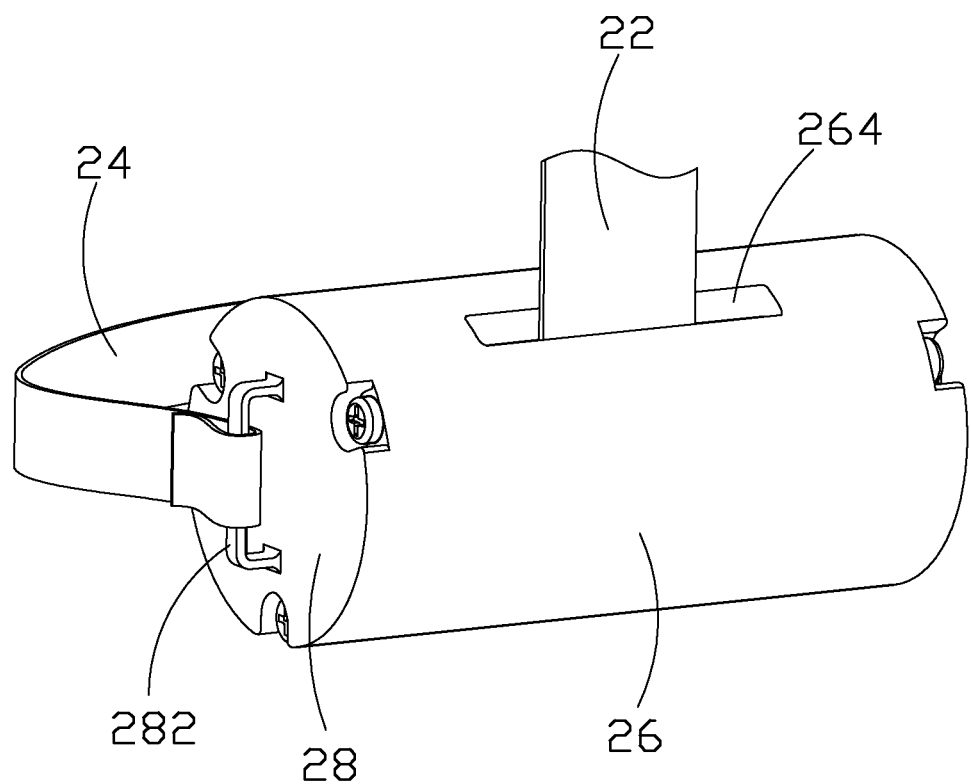
FIG. 3 is a schematic view of the camera positioning system shown in FIG. 1.
Figure 4:
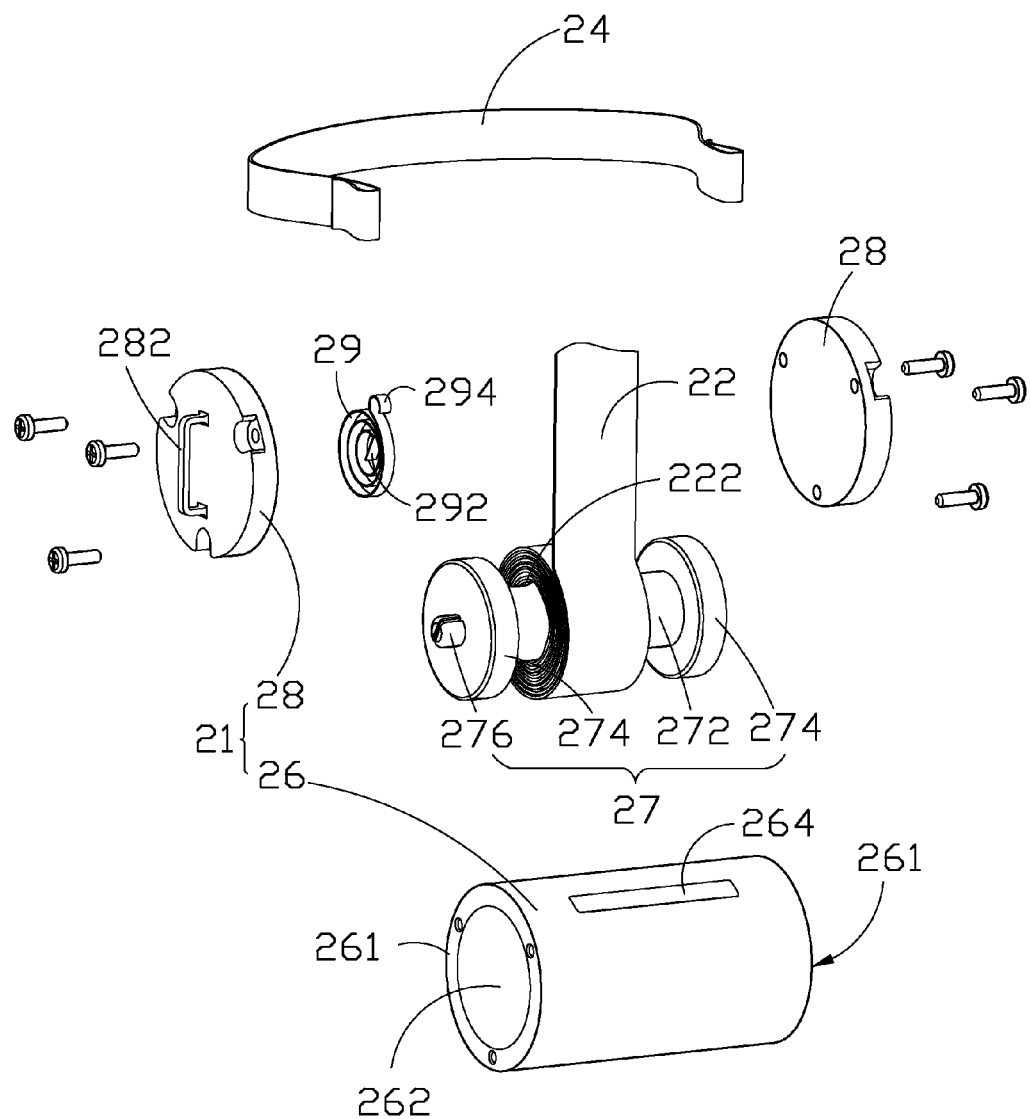
FIG. 4 is a disassembled sectional view of FIG. 3.

With reference to FIG. 3 and FIG. 4, the camera positioning system 20 comprises a securing bracket 21, a belt 22, a shaft member 27 and a spring member 29. The securing bracket 21 is fixed near the screen portion 14, and in this embodiment, the securing bracket 21 is fixed to the base 16 of the display screen 10. The shaft member 27 is rotatably connected to the securing bracket 21. The belt 22 is wound around the shaft member 27 with an inner end 222 fixed to the shaft member 27 and an outer end 224 (shown in FIG. 2) extending out from the securing bracket 21 to pass through the screen portion 14. The spring member 29 is elastically connected between the shaft member 27 and the securing bracket 21, providing an elastic force to make the shaft member 27 automatically rotate and wind the belt 22.

The securing bracket 21 comprises a housing 26 configured in tubular shape and a pair of end covers 28 fixed to two opposite end surfaces 261 of the housing 26. The housing 26 defines a receiving room 262 and a through hole 264 configured between the two opposite end surfaces 261 and communicating the receiving room 262 to an exterior of the housing 26. The receiving room 262 perforates axially between the two opposite end surfaces 261. That is, the housing 26 is configured as a hollow tube, and the shaft member 27 is installed into the receiving room 262 of the housing 26 from one of the end surfaces 261.

Figure 5:
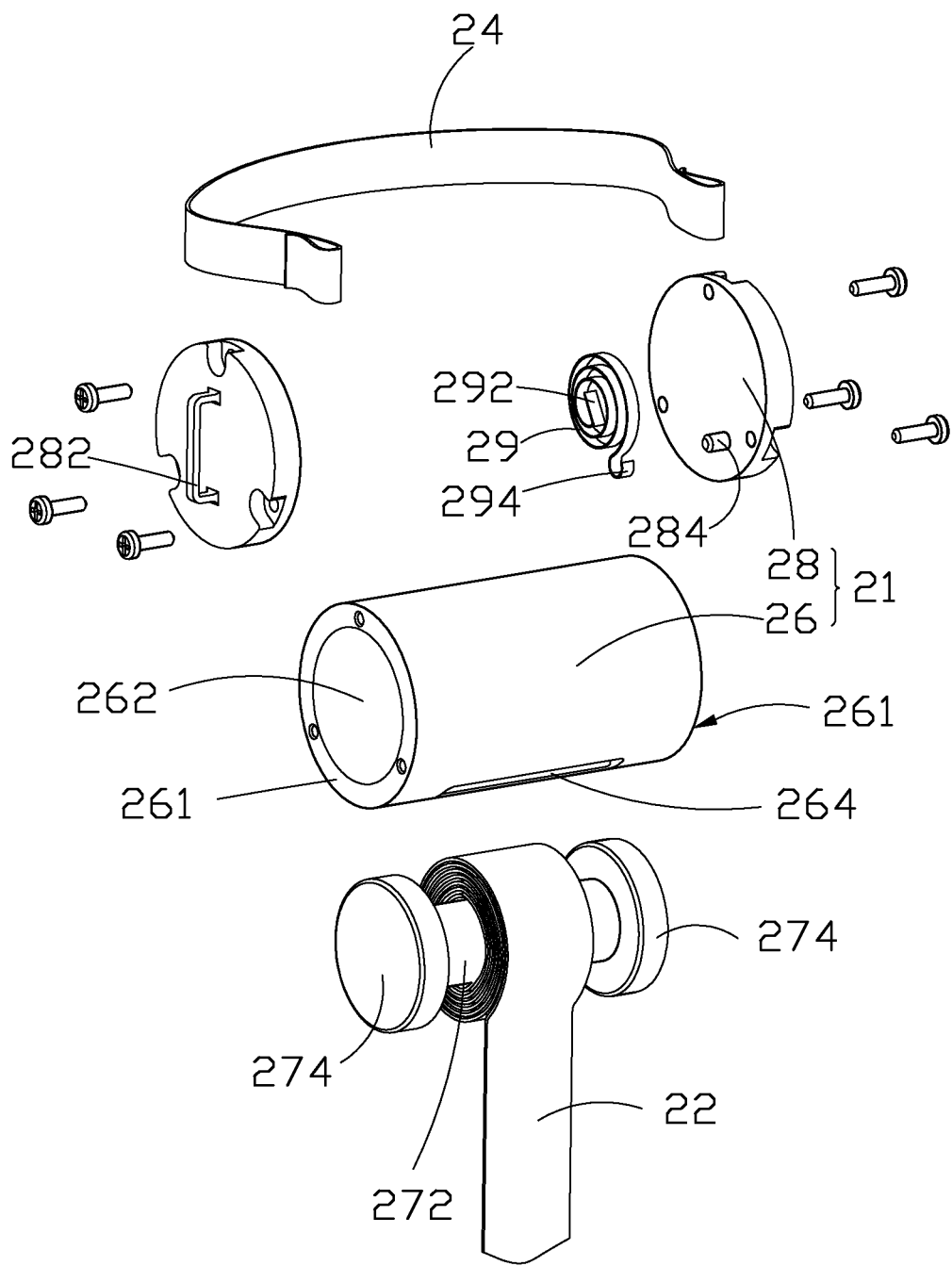
FIG. 5 is a disassembled sectional view of FIG. 3, showing from another direction.

Referring to FIG. 5, the pair of end covers 28 are respectively fixed to the two opposite end surfaces 261 to divide the receiving room 262 from the exterior of the housing 26. Each of the pair of end covers 28 comprises a securing portion 282. The camera positioning system 20 further comprises a securing belt 24, two ends of which are respectively secured to the securing portions 282 of the pair of end covers 28. The securing belt 24 is used to secure the camera positioning system 20 to the base 16 of the display screen 10, shown in FIG. 1 and FIG. 6. One of the pair of end covers 28 comprises a fixing post 284 extending toward the receiving room 262.

The spring member 29 is configured as a spiral spring and comprises a center end 292 located at center of the spring member 29 and an outside end 294 located at periphery of the spring member 29. The center end 292 is fixed on a center axis of the shaft member 27. The outside end 294 is fixed to the fixing post 284 of the securing bracket 21.

The shaft member 27 comprises a rod portion 272, a pair of wheel portions 274 and a fixing protrusion 276. The pair of wheel portions 274 are respectively disposed two end surfaces of the rod portion 272 and parallel with each other. The belt 22 is wound around the rod portion 272 with the inner end 222 of the belt 22 being fixed to the rod portion 272. The pair of wheel portions 274 are shaped as a column shape, and the outer periphery of each wheel portion 274 snugly contacts with an inner surface of the housing 26. That is, the shaft member 27 is rotatably positioned in the housing 26 via engagement between the housing 26 and the wheel portions 274.

The rod portion 272, the pair of wheel portions 274, and the housing 26 cooperatively form an accommodate space to receive the belt 22. The through hole 264 communicates the accommodate space to the exterior of the housing 26 to provide a channel for pulling the belt 22 out from the housing 26. The fixing protrusion 276 protrudes from one of the pair of wheel portions 274 and extends toward the end cover 28 comprising the fixing post 284 along the center axis of the shaft member 27. The center end 292 of the spring member 29 is fixed to the fixing protrusion 276.

When the belt 22 is not pulled, that is the belt 22 is wound completely between the rod portion 272 and the housing 26, the spring member 29 is configured in a loose status. When the belt 22 is pulled out, the belt 22 is capable of driving the shaft member 27 to rotate in an obverse direction in the housing 26, to tighten the spring member 29 to generate an elasticity of retraction.

Figure 6:
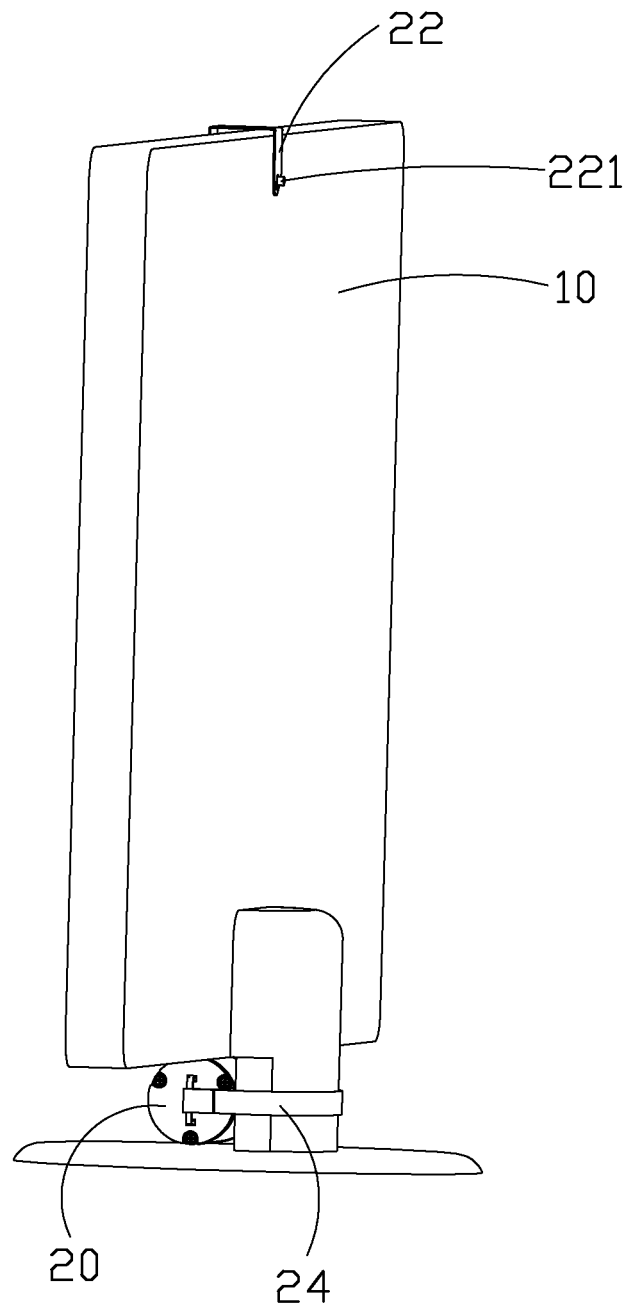
FIG. 6 is a schematic view of the camera positioning system employing in the display screen, similar to FIG. 1, but showing from another direction.

Referring to FIG. 2 and FIG. 6, the belt 22 comprises a latching member 221 configured on the outer end 224 and disposed outside of the housing 26. In this embodiment, the latching member 221 is configured on the outer end 224 of the belt 22 extending out from the housing 26, and comprises a magnet used to position the outer end 224 of the belt 22 to the top side 124 of the frame 12 of the display screen 10 via magnetic force between the latching member 221 and the frame 12.

When the latching member 121 disengages with the top side 124 of the frame 12, the belt 22 is released, and the spring member 29 drives the shaft member 27 rotate in a reverse direction and wind the belt 22 automatically. When the belt 22 is completely wound between the rod portion 272 and the housing 26, the latching member 121 is blocked outside of the housing 26, due to a smaller size of the through hole 264 than that of the latching member 12.

The camera 30 comprises a back surface 31 and a clamp 32 disposed on the back surface 31. The clamp 32 engages with the belt 22 to position the camera 30 to the belt 22.

Based on the foregoing, the camera positioning system 20 allows a user to view the screen portion 14 of the display screen 10 to easily position the camera 30 proximate his eye level. Thus, during videoconferencing, the other side party may receive the impression that the user is looking him directly in the eye, providing eye contact communication.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A camera positioning system, comprising:
a securing bracket fixed near a screen portion of a display screen;
a shaft member rotatably connected to the securing bracket;
a belt wound around the shaft member with an inner end fixed to the shaft member and an outer end extending out from the securing bracket to pass through the screen portion; and
a spring member elastically connected between the shaft member and the securing bracket to provide an elastic force to make the shaft member automatically rotate;
wherein a camera is removably secured to the belt, and the camera positioning system allows a user to adjustably position the camera along a vertical axis of the display screen.

2. The camera positioning system as claimed in claim 1, wherein the spring member is configured as a spiral spring and comprises a center end fixed on a center axis of the shaft member and an outer end fixed to the securing bracket.

3. The camera positioning system as claimed in claim 2, wherein the shaft member comprises a rod portion, a pair of wheel portions, and a fixing protrusion, the pair of wheel portions are respectively disposed two end surfaces of the rod portion and parallel with each other, the belt is wound around the rod portion, the fixing protrusion protrudes from one of the pair of wheel portions along the center axis of the shaft member, and the center end of the spring member is fixed to the fixing protrusion.

4. The camera positioning system as claimed in claim 3, wherein the securing bracket comprises a housing configured as a hollow tube, in which the shaft member is received, the housing defines a through hole providing a channel for pulling the belt out from the housing, and the shaft member is rotatable positioned in the housing via engagement between the housing and the pair of wheel portions of the shaft member.

5. The camera positioning system as claimed in claim 4, wherein the housing further comprises a pair of end covers respectively fixed to two opposite end surfaces of the housing, one of the pair of end covers comprises a fixing post extending toward the receiving room to fix the outer end of the spring member.

6. The camera positioning system as claimed in claim 5, wherein each of the pair of end covers comprises a securing portion, and a securing belt engages with the pair of securing portions to fix the camera positioning system near the screen portion.

7. The camera positioning system as claimed in claim 1, wherein the belt comprises a latching member disposed outside of the housing, the display screen comprises a frame comprising a bottom side and a top side, the screen portion is configured in the frame, the securing bracket is fixed near the bottom side, the latching member is fixed to the top side to make the outer end of the belt pass through the screen portion.

8. The camera positioning system as claimed in claim 7, wherein the outer end of the belt is positioned to the top side of the frame via magnetic force between the latching member and the frame.

9. The camera positioning system as claimed in claim 1, wherein the camera comprises a back surface and a clamp disposed on the back surface and engaging with the belt to position the camera.

10. A camera positioning system allowing a user viewing a screen portion of a display screen to adjustably position a camera along a vertical axis of the display screen, the camera positioning system comprising:
a securing bracket, defining a receiving room and a through hole; and
a belt, wound in the receiving room of the securing bracket and extending out from the through hole to pass through the screen portion;
wherein the camera is removably secured to the belt.

11. The camera positioning system as claimed in claim 10, further comprising a shaft member received in the receiving room and rotatably connected to the securing bracket, the belt wound on the shaft member and comprising an inner end fixed to the shaft member and an outer end passing through the through hole and extending out from the securing bracket.

12. The camera positioning system as claimed in claim 11, wherein the belt comprises a latching member configured on the outer end of the belt, the display screen comprises a frame comprising a bottom side and a top side, the screen portion is configured in the frame, the securing bracket is fixed near the bottom side, and the latching member is fixed to the top side to make the outer end of the belt pass through the screen portion.

13. The camera positioning system as claimed in claim 12, wherein the latching member is blocked outside of the securing bracket due to a smaller size of the through hole than that of the latching member.

14. The camera positioning system as claimed in claim 12, wherein the outer end of the belt is positioned to the top side of the frame via magnetic force between the latching member and the frame.

15. The camera positioning system as claimed in claim 11, further comprising a spring member elastically connected between the shaft member and the securing bracket to provide an elastic force to make the shaft member automatically rotate, wherein the spring member is configured in a loose status when the belt is not pulled, and when the belt is pulled out, the belt is capable of driving the shaft member rotate in the securing bracket to tighten the spring member to generate an elasticity of retraction.

\* \* \* \* \*